United States Patent
Dubey et al.

(10) Patent No.: US 11,223,723 B2
(45) Date of Patent: Jan. 11, 2022

(54) CALL CENTER SYSTEM HAVING REDUCED COMMUNICATION LATENCY

(71) Applicant: Accenture Global Solutions Limited, Dublin (IE)

(72) Inventors: Alpana Dubey, Bangalore (IN); Kumar Abhinav, Bangalore (IN); Manish Mehta, Milpitas, CA (US); Susan Miller, Falls Church, VA (US)

(73) Assignee: Accenture Global Solutions Limited, Dublin (IE)

( * ) Notice: Subject to any disclaimer, the term of this patent is extended or adjusted under 35 U.S.C. 154(b) by 728 days.

(21) Appl. No.: 16/053,361

(22) Filed: Aug. 2, 2018

(65) Prior Publication Data

US 2019/0124202 A1  Apr. 25, 2019

(30) Foreign Application Priority Data

Oct. 23, 2017  (IN) .............................. 201741037344

(51) Int. Cl.
*G06F 16/18* (2019.01)
*H04M 3/51* (2006.01)
(Continued)

(52) U.S. Cl.
CPC .... *H04M 3/5183* (2013.01); *G06F 16/90335* (2019.01); *G06N 20/00* (2019.01);
(Continued)

(58) Field of Classification Search
CPC ............. H04M 3/5183; H04M 3/5175; H04M 2203/403; G06F 16/90335; G06N 20/00; G06Q 10/063112; G06Q 50/01
(Continued)

(56) References Cited

U.S. PATENT DOCUMENTS 7,658,327 B2  2/2010  Tuchman et al.
8,600,034 B2  12/2013  Teitelman et al.
(Continued)

OTHER PUBLICATIONS

Examination Report No. 2 in Australia Application No. 2018233014, dated Jul. 15, 2019, 4 pages.
(Continued)

*Primary Examiner* — William J Deane, Jr.
(74) *Attorney, Agent, or Firm* — Crowell & Moring LLP

(57) ABSTRACT

A call center system for reducing communication latency includes an input/output (I/O) interface for receiving one or more queries from a customer terminal; a processor in communication with the I/O interface; and non-transitory computer readable media in communication with the processor that stores instruction code. The instruction code is executed by the processor and causes the processor to route the one or more queries to a plurality of artificial intelligent (AI) logic modules and receive, from one or more of the AI logic modules, information that facilitates providing, by a call center agent, responses to the one or more queries. The processor also routes actual responses to the one or more queries made by the call center agent to the AI logic modules; and receives from at least one AI logic module one or more scores associated with one or more metrics that rate different aspects if the actual responses. When at least one of the scores is below a threshold, the processor communicates training information to the call center agent. The training information is directed to a subject area associated with the score being below the threshold. Communication of the information to the call center agent reduces a latency between receipt of the one or more queries and communication of correct responses to the one or more queries.

17 Claims, 12 Drawing Sheets

(51) Int. Cl.
    *G06Q 50/00*     (2012.01)
    *G06Q 10/06*     (2012.01)
    *G06N 20/00*     (2019.01)
    *G06F 16/903*     (2019.01)

(52) U.S. Cl.
    CPC ..... *G06Q 10/063112* (2013.01); *G06Q 50/01* (2013.01); *H04M 3/5175* (2013.01); *H04M 2203/403* (2013.01)

(58) Field of Classification Search
    USPC .................. 706/12, 52; 704/209, 233, 235; 705/14.7; 379/88.18
    See application file for complete search history.

(56) References Cited

U.S. PATENT DOCUMENTS

| | | | | |
|---|---|---|---|---|
| 9,635,175 | B2* | 4/2017 | Skiba | H04M 3/42382 |
| 10,306,059 | B1* | 5/2019 | Bondareva | H04M 3/5166 |
| 10,453,070 | B2* | 10/2019 | Lita | G06Q 30/00 |
| 10,609,216 | B1* | 3/2020 | Banerjee | G06N 3/08 |
| 10,630,840 | B1* | 4/2020 | Karp | H04L 63/0807 |
| 10,672,383 | B1* | 6/2020 | Thomson | G10L 15/183 |
| 10,733,614 | B2* | 8/2020 | Sapoznik | G06F 40/35 |
| 10,922,491 | B2* | 2/2021 | Renard | G06F 16/3329 |
| 2002/0055973 | A1 | 5/2002 | Low et al. | |
| 2006/0256753 | A1 | 11/2006 | Pulaski et al. | |
| 2006/0256953 | A1 | 11/2006 | Pulaski et al. | |
| 2008/0183852 | A1 | 7/2008 | Pramer et al. | |
| 2013/0111487 | A1 | 5/2013 | Cheyer et al. | |
| 2013/0275164 | A1 | 10/2013 | Gruber et al. | |
| 2015/0032675 | A1* | 1/2015 | Huehn | G06Q 50/01 706/12 |
| 2015/0278709 | A1* | 10/2015 | Zeng | G06N 20/00 706/12 |
| 2016/0328526 | A1 | 11/2016 | Park et al. | |
| 2017/0213131 | A1 | 7/2017 | Hammond et al. | |
| 2017/0357720 | A1* | 12/2017 | Torabi | G06N 3/08 |
| 2018/0039406 | A1* | 2/2018 | Kong | G06F 16/951 |
| 2018/0322537 | A1* | 11/2018 | Driemeyer | G06Q 30/0276 |
| 2018/0365380 | A1* | 12/2018 | Limsopatham | G16H 50/70 |
| 2020/0118400 | A1* | 4/2020 | Zalewski | G06Q 20/327 |
| 2020/0202840 | A1* | 6/2020 | Zoller | G06Q 50/01 |

OTHER PUBLICATIONS

Rankminer "4 Benefits of Automated Contact Centre Quality Assurance", Jan. 18, 2016, available at https://rankminer.com/4-benefits-of-automated-contact-center-quality-assurance.

Callminer, "Why Real-Time Monitoring Is So Important in the Contact Centre", Dec. 5, 2013, available at https://callminer.com/blog/real-time-monitoring.

Soulez, T. "How Artificial Intelligence in the Contact Center Will Work", Mar. 29, 2017, available at https://www.nexmo.com/blog/2017/03/29/artificial-intelligence-contact-center.

Examination Report No. 1 for Australian application No. 2018233014 dated Mar. 18, 2019, 7 pages.

Examination Report No. 3 issued on Australian Patent application No. 2018233014 dated Dec. 17, 2019, 4 pages.

Examination Report No. 1 in Australia Application No. 2020201883, dated Feb. 11, 2021, 5 pages.

Examination Report No. 2 for Australian Application 2020201883 dated Aug. 17, 2021, 5 pages.

Yoshino, K. et al.."Dialogue state tracking using long short term memory neural networks", in Proceedings of Seventh International Workshop on Spoken Dialog Systems, Riekonlinna, Finland, Jan. 13-16, 2016, pp. 1-8.

Fujita, T., "Long short-term memory networks for automatic generation of conversations," 18$^{th}$ IEEE/ACIS International Conference on Software Engineering, Artificial Intelligence, Networking and Parallel/Distributed Computing, Jun. 26-28, 2017, pp. 483-487.

\* cited by examiner

CALL CENTER SYSTEM HAVING REDUCED COMMUNICATION LATENCY

RELATED APPLICATIONS

This application claims the benefit of priority under 35 U.S.C. § 119 to Indian Patent Application No. 201741037344, filed Oct. 23, 2017, which is incorporated by reference in its entirety.

BACKGROUND

Field

This application generally relates to call center systems. In particular, this application describes a call center system having reduced communication latency.

Description of Related Art

Agents at call centers typically field questions from customers on a variety of product and service related subjects. Agents normally undergo some level of training so that they can properly address the questions. However, there are instances where the agent simply does not know the answer to the question being posed. In these cases, the agent may have to find other, more knowledgeable agents at the call center for assistance. This, however, results in delay which may frustrate the customer and ultimately result in poor customer service ratings for the company associated with the products/services. This delay also ties up valuable computing and network resources because the agent has to keep the connection to the customer active until resolution to the problem has been provided.

SUMMARY

In a first aspect, a call center system for reducing communication latency includes an input/output (I/O) interface to receive one or more queries from a customer terminal; a processor in communication with the I/O interface; and non-transitory computer readable media in communication with the processor that stores instruction code. The instruction code is executed by the processor and causes the processor to route the one or more queries to a plurality of artificial intelligent (AI) logic modules and receive, from one or more of the AI logic modules, information that facilitates providing, by a call center agent, responses to the one or more queries. The processor also routes actual responses to the one or more queries made by a call center agent to the AI logic modules; and receives from at least one AI logic module one or more scores associated with one or more metrics that rate different aspects if the actual responses. When at least one of the scores received from the at least one AI logic module is below a threshold, the processor communicates training information to the call center agent. The training information is directed to a subject area associated with the score being below the threshold. Communication of the information that facilitates providing, by the call center agent, responses to the one or more queries reduces a latency between receipt of the one or more queries and communication of correct responses to the one or more queries.

In a second aspect, a method on a call center system for reducing communication latency includes receiving one or more queries from a customer terminal; routing the one or more queries to a plurality of artificial intelligent (AI) logic modules; and receiving, from one or more of the AI logic modules, information that facilitates providing, by a call center agent, responses to the one or more queries. The method also includes routing actual responses to the one or more queries made by the call center agent to the AI logic modules; and receiving from at least one AI logic module one or more scores associated with one or more metrics that rate different aspects of the actual responses. When at least one of the one or more scores received from the at least one AI logic module is below a threshold, the method includes communicating training information to the call center agent. The training information is directed to a subject area associated with the score being below the threshold. Communication of the information that facilitates providing, by the call center agent, responses to the one or more queries reduces a latency between receipt of the one or more queries and communication of correct responses to the one or more queries.

In a third aspect, a non-transitory computer readable media that stores instruction code for reducing communication latency in a call center system is provided. The instruction code is executable by a machine for causing the machine to: receive one or more queries from a customer terminal; route the one or more queries to a plurality of artificial intelligent (AI) logic modules; and receive, from one or more of the AI logic modules, information that facilitates providing, by a call center agent, responses to the one or more queries. The machine also routes actual responses to the one or more queries made by the call center agent to the AI logic modules; and receives from at least one AI logic module one or more scores associated with one or more metrics that rate different aspects of the actual responses. When at least one of the one or more scores received from the at least one AI logic module is below a threshold, the machine communicates training information to the call center agent. The training information is directed to a subject area associated with the score being below the threshold. Communication of the information that facilitates providing, by the call center agent, responses to the one or more queries reduces a latency between receipt of the one or more queries and communication of correct responses to the one or more queries.

DETAILED DESCRIPTION

The embodiments described below overcome the problems described above by providing a call center system that implements a variety of artificial intelligent (AI) modules, each being specifically configured to provide different forms of assistance to the call center agent in addressing customer concerns. The AI modules reduce delay by analyzing, in real-time, questions posed by the customer and by immediately providing information to the agent that can assist the agent in responding to the customer in a timely manner. Some of the AI modules assess the quality/correctness of the responses given by the agent to the customer by comparing the conversation between the customer and the agent to previously recorded conversations that have been ranked according to quality. Other AI modules, described below, determine inadequacies in responses provided by the agent and automatically direct the agent to training information related to the inadequacies.

The overall results of these aspects are a reduction in time between a question being received and an appropriate answer to the question being provided. This in turn, reduces computer and network resource usage by the call center system.

Figure 1:
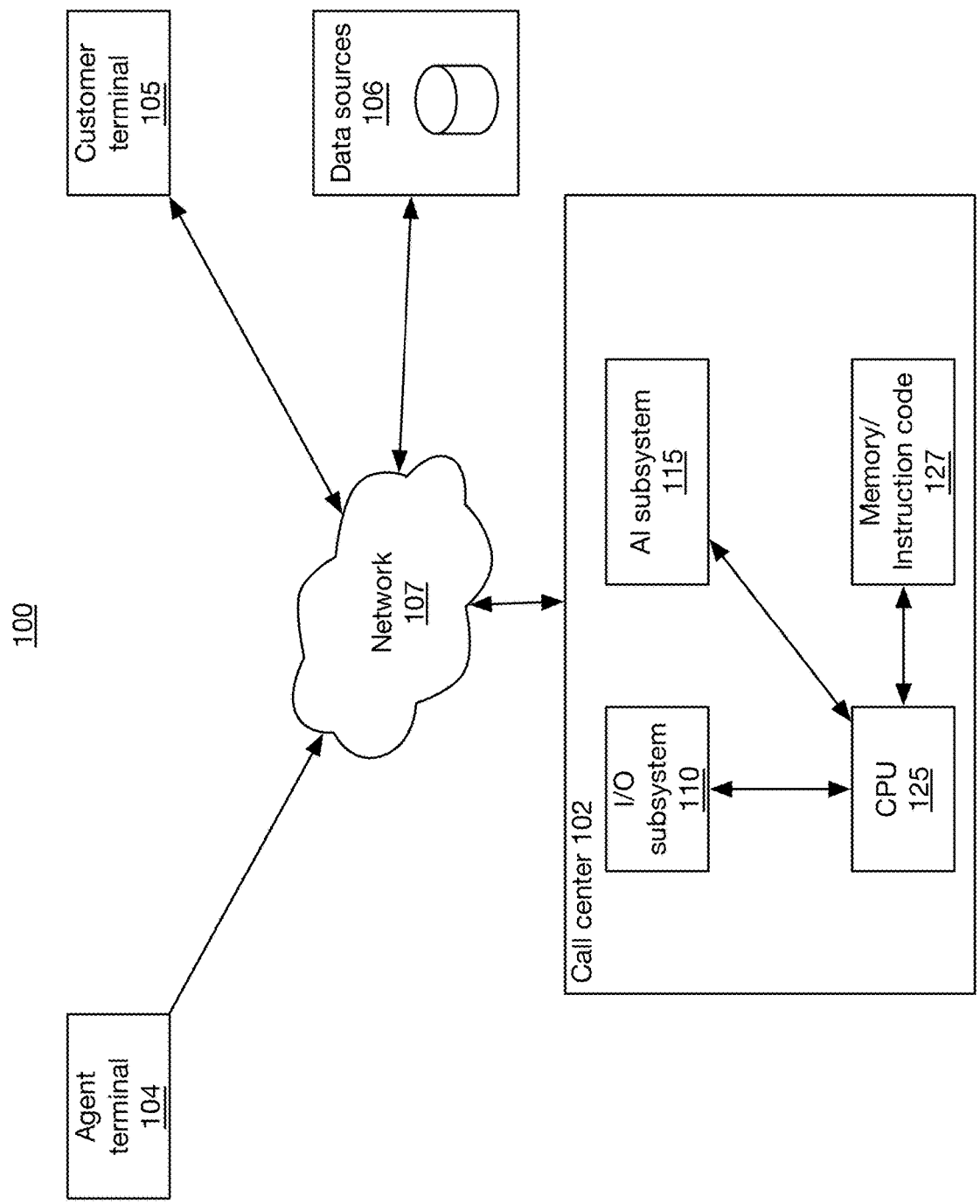
FIG. 1 illustrates an exemplary environment that includes various systems/devices that facilitate reduction in call center communication latencies.

FIG. 1 illustrates an exemplary environment 100 that includes various systems/devices that facilitate a reduction in call center communication latencies. Exemplary systems/devices of the environment 100 include a call center 102, an agent terminal 104, a customer terminal 105, and data sources 106.

The various entities of the environment 100 may communicate with one another via a network 107, such as the Internet and may correspond to computer systems such as an Intel®, AMD®, or PowerPC® based computer system or a different computer system and can include application specific computer systems. The computer systems may include an operating system, such as Microsoft Windows®, Linux®, Unix® or other operating system. The terminals may be desktop PCs and/or mobile terminals.

The agent terminal 104 may correspond to a computer at which a call center agent operates in processing requests from customers. To facilitate communicating information to the call center 102, the agent terminal 104 may implement one or more application programming interfaces ("APIs"). For example, the agent terminal 104 may be configured to communicate with the call center 102 via an API such as a webserver API, a SOAP-based web service, a RESTful API, and/or a different type of API.

The customer terminal 105 may correspond to a computer at which a customer enters queries related to a product, topic, service, etc. In this regard, the customer terminal 105 may be configured to facilitate communicating information with the call center 102 via one or more APIs of the call center 102. For example, the customer terminal 105 may be configured to communicate with the call center 102 via an API such as a webserver API, a SOAP-based web service, a RESTful API, and/or a different type of API.

The data sources 106 may correspond to any system that stores documentation that may be related to queries posed by a customer. For example, the data sources 106 may correspond to product information repository systems that store various manuals related to different products and services. The data sources 106 may correspond to call center systems that store call center logs associated with conversations between call center agents and customers. The logs may be text logs, voice logs, or a combination thereof.

The data sources 106 may correspond to social media servers that host publicly available information that may be related to the products, services, etc. For example, the social media servers may correspond to Facebook®, Twitter®, LinkedIn®, etc. The social media servers may include blogs, forums, and/or any other systems or websites from which information related to the products, services, etc., may be obtained.

The data sources 106 may be configured to facilitate communicating information with the call center 102 via one or more APIs described above.

The call center 102 may include a processor 125, input/output subsystem 110, and an AI subsystem 115. The call center 102 may include other subsystems.

The I/O subsystem 110 of the call center 102 is configured to facilitate communications with entities outside of the call center 102. In this regard, the I/O subsystem 110 may be configured to dynamically determine the communication methodology utilized by entities of the environment 100 for communicating information to the entities using the determined communication methodology. For example, the I/O subsystem 110 may determine that a first entity utilizes a RESTful API and may, therefore, communicate with the entity using a RESTful communication methodology.

As described in more detail below, the I/O subsystem 110 may implement a web browser to facilitate generating one or more web-based interfaces through which users of agent terminal 104, customer terminal 105, and/or other systems may interact with the call center 102. The web browser may implement a web services interface to facilitate automating some of the web-based functionality via a computer. For example, one or more of the entities of the environment 100 may utilize the web services interfaces to access information stored by the call center 102 and/or to communicate information to the call center 102.

The AI subsystem 115 may correspond to hardware specifically configured to perform or assist in the performance of various natural language processing techniques such as latent Dirichlet allocation (LDA) to identify topics associated with conversations, hierarchical density based cluster analysis (H-DBSCAN) to group conversations under one or more topics, Knuth-Morris-Pratt string searching to locate and extract occurrences of a certain words within conversations, possibly linear clustering algorithms to mine text data, and/or other techniques. As described in more detail below, these operations facilitate performing various machine learning operations on a chat session between an agent and a customer to facilitate reducing communication latency between the agent and the customer.

The CPU 125 executes instruction code stored in a memory device 127 for coordinating activities performed between the various subsystems. The processor 125 may correspond to a stand-alone computer system such as an Intel®, AMD®, or PowerPC® based computer system or a different computer system and can include application specific computer systems. The computer systems may include an operating system, such as Microsoft Windows®, Linux®, Unix® or other operating system.

It is contemplated that the I/O subsystem 110, AI subsystem 115, and any other subsystem referenced herein may correspond to a stand-alone computer system such as an Intel®, AMD®, or PowerPC® based computer system or a different computer system and can include application specific computer systems. The computer systems may include an operating system, such as Microsoft Windows®, Linux®, Unix® or other operating system. It is also contemplated that operations performed on the various subsystems may be combined into a fewer or greater number of subsystems to facilitate speed scaling, cost reductions, etc.

Exemplary operations of the CPU 125 and/or other modules of the call center 102 in reducing communication latency between the agent and the customer are illustrated in the FIGS. 2-10. In this regard, the operations may be implemented via instruction code stored in non-transitory computer readable media 127 that resides within the subsystems configured to cause the respective subsystems to perform the operations illustrated in the figures and discussed herein.

Figure 2:
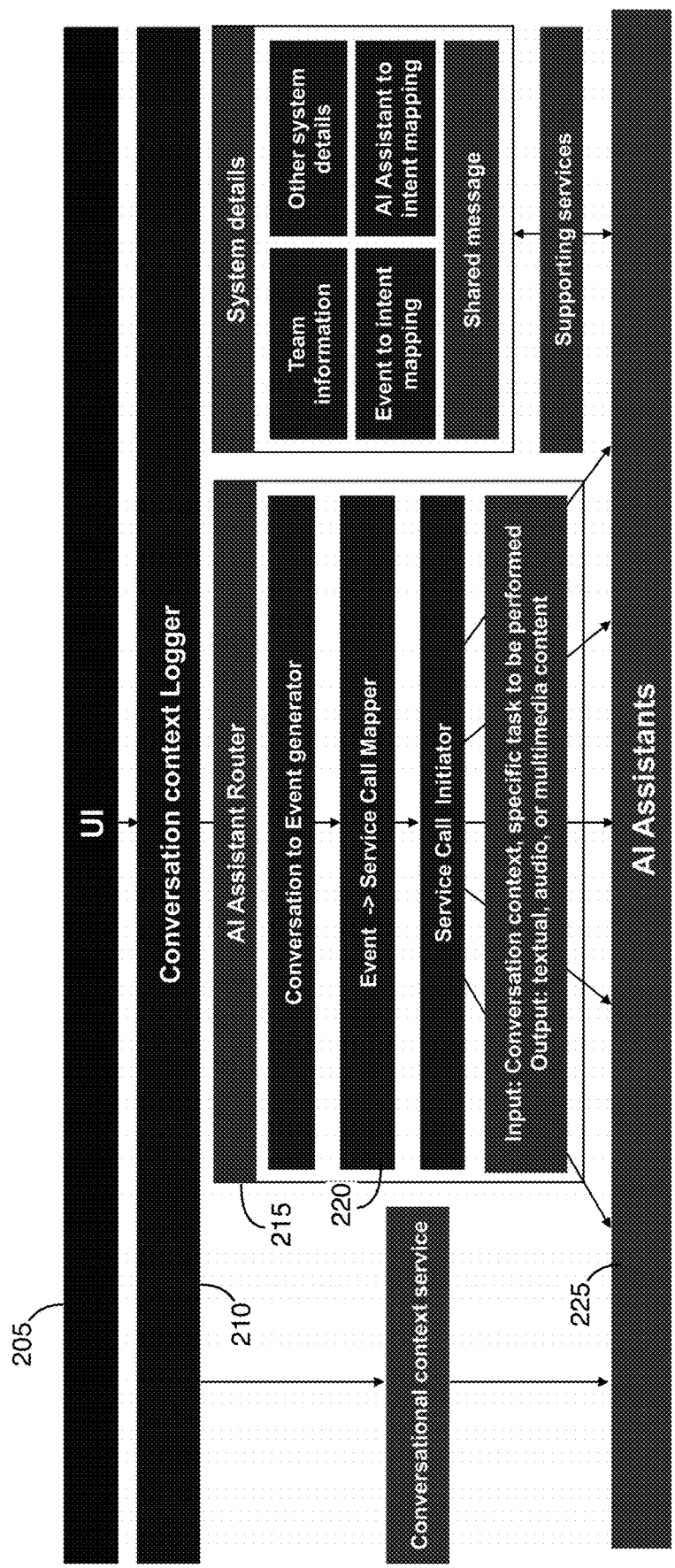
FIG. 2 illustrates a logical representation of an artificial intelligent (AI) assistance model that may be implemented on a call center of the environment.

FIG. 2 illustrates a logical representation of an artificial intelligent (AI) assistance model that may be implemented by the instruction code on the call center 102 that facilitates reducing communication latency between the agent and the customer. As shown, queries and responses of a chat session are generally captured via a UI block 205 and communicated to a conversation context logger 210 that maintains the chat session. An AI assistant router 215 converts the conversation of the chat to an event and then maps the event to a service call mapper 220. The service call mapper 220 communicates the different aspect of the conversation to different types of AI assistant modules 225, each being configured to implement a different kind of AI logic. FIGS. 3A-8 illustrate certain exemplary AI assistant modules 225 that may be implemented by the instruction code.

Figure 3A:
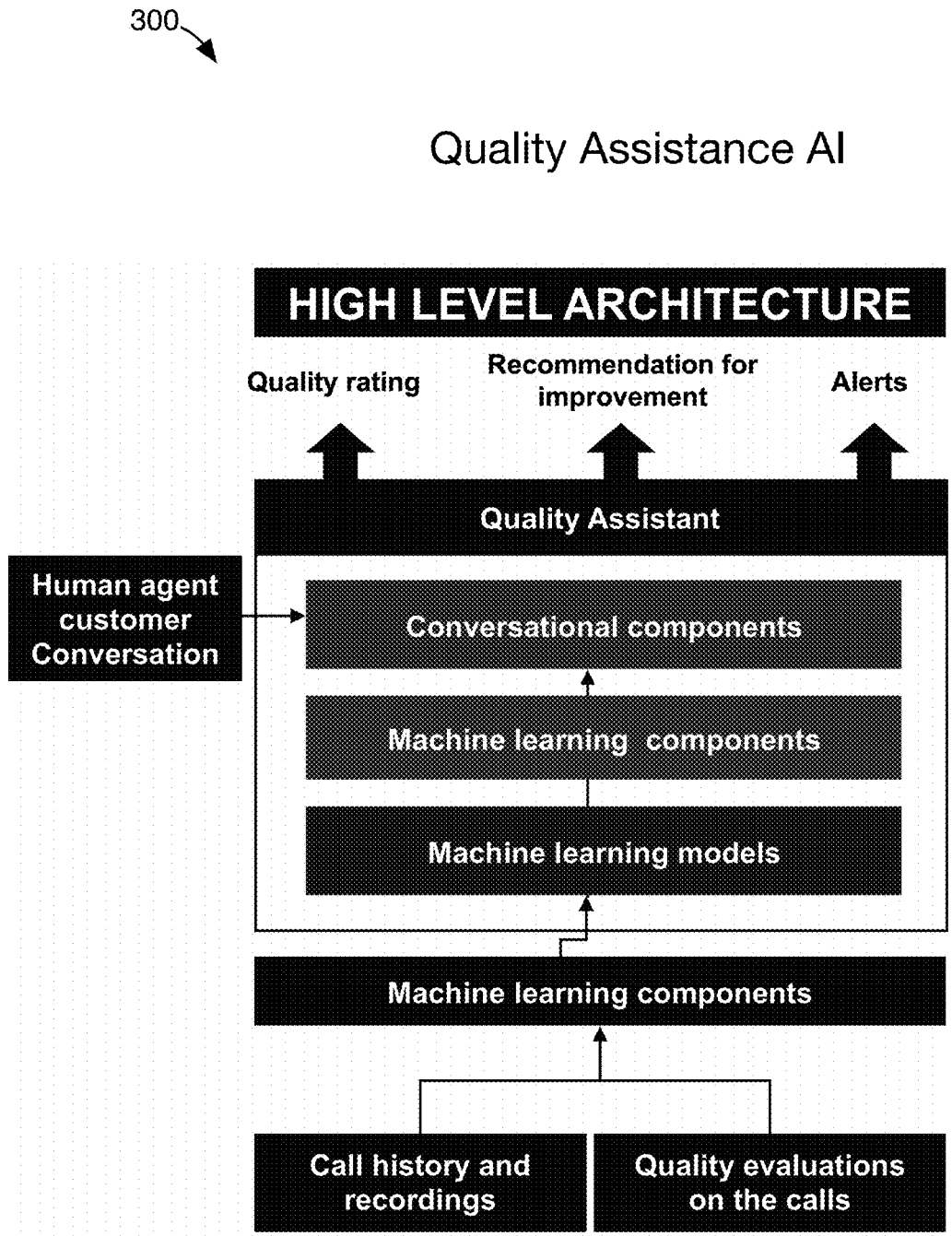
FIG. 3A illustrates a quality assistance AI module that evaluates the quality of responses provided by an agent to a customer.

Referring to FIG. 3A, a quality assistance AI module 300 implemented on the CPU 125 performs alone or in cooperation with the AI subsystem 115 various machine learning techniques to evaluate the quality of the responses provided by an agent to a customer. In this regard, the quality assistance AI module 300 audits the conversation (in textual, voice, video forms) between the agent and customer and analyzes the conversation to provide feedback to the agent to thereby improve the agents call handling.

In this regard, the quality assistance AI module 300 combines rule-based methods with a deep learning based approach to evaluate the conversation in real-time and to provide feedback to the agent on different organizational compliance aspects. For example, conversational data previously evaluated by human experts may be used to train a deep learning based long-short term memory (LSTM). The agent's response sequence is input as word embedding into the LSTM which in turn predicts whether the conversation satisfies call evaluation criteria or not based on the training data.

The quality assistance AI module 300 operates in two modes, namely an on-call/live assistance mode and a post-call assistance mode. In the on-call/live assistance mode, the quality assistance AI module 300 analyzes and provides proactive support to handle the conversation properly. For instance, if the tone of the agent is determined by the quality assistance AI module 300 to be aggressive, the quality assistance AI module may recommend a change in tone and provide suggestions on how to change the tone.

Figures 3B, 3C, 3D:
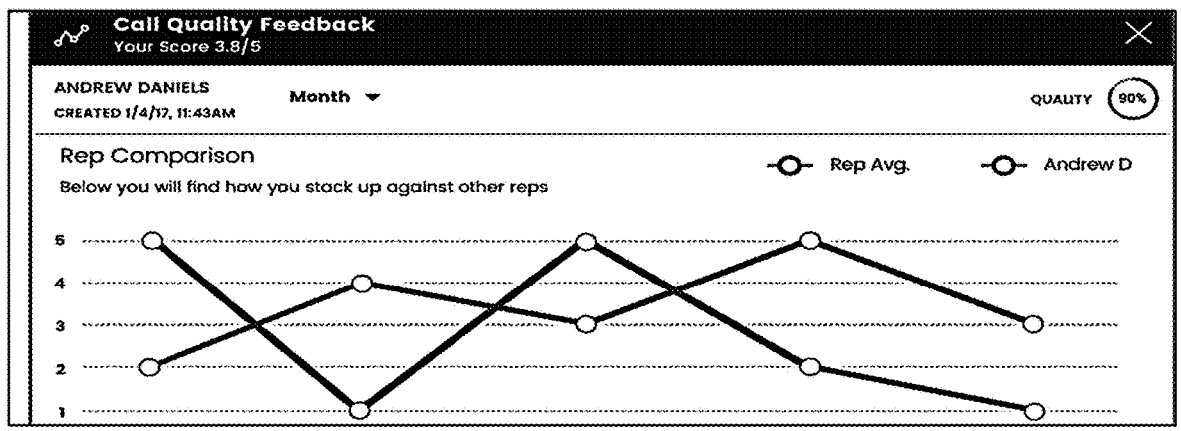
FIGS. 3B-3D illustrate various reports generated by the quality assistance AI module.

During the post-call assistance mode, the quality assistance AI module 300 provides a comprehensive quality evaluation after the chat is over. The conversation is rated over quality metrics typically used in the call center industry. For example, as illustrated in FIG. 3B, the quality assistance AI module 300 may generate a report to the agent or to a supervisor flagging problems detected during the chat session. Links to documents describing techniques to resolving the problems may be provided to facilitate quick access to appropriate solutions.

As illustrated in FIG. 3C, the quality assistance AI module 300 may generate a report that specifies how well the conversation adhered to various metrics along with a score for each metric. For example, a greeting metric may measure whether the agent used a greeting or how appropriate the greeting was. A contact information metric may measure whether the agent provided the agent's contact information and/or requested contact information of the customer. The quality assistance AI module 300 may also attempt to determine an emotional component to the conversation to determine whether that agent expressed the right amount of empathy towards the customer.

As illustrated in FIG. 3D, the quality assistance AI module 300 may generate a graph that compares the metrics associated with the conversation by the agent to an average score associated with other agents and/or with an organization's standard for each metric.

The information described above may be provided weekly, monthly, etc. to the agent's supervisor so that the supervisor may assess the agent's strengths and weaknesses.

Figure 4:
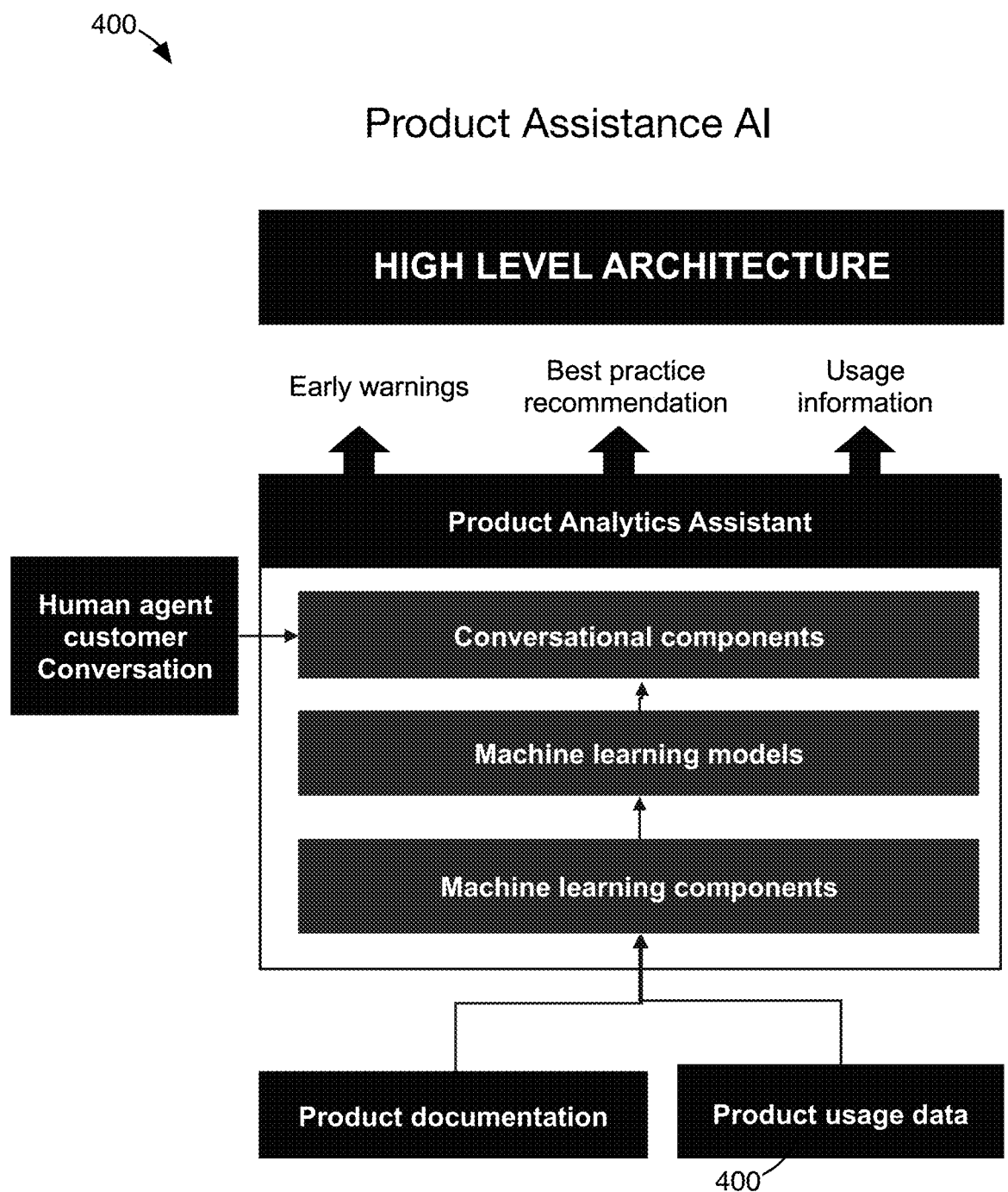
FIG. 4 illustrates a product assistance AI module that identifies products, services, and topics being discussed in a conversation between an agent and a customer, along with customer's product usage details and other product-related information useful to an agent in assisting a customer.

Referring to FIG. 4, a product assistance AI module 400 implemented on the CPU 125 performs alone or in cooperation with the AI subsystem 115 various machine learning techniques to identify products, services, and topics being discussed in the conversation. The product assistance AI module 400 is configured to proactively retrieve information about products and topics similar to those being discussed in the conversation and to provide product usage information related to the products to the agent. For example, the product assistance AI module 400 may relay customer product usage patterns/data 405 associated with the products/services to the agent. The product assistance AI module 400 may relay to the agent any issues raised by customers who have usage patterns similar to the customer currently communicating with the agent. In some implementations, usage of a given product may be determined via IOT (Internet of Things) sensors of the product that provide sensor data to a centralized data source 106 indicative of customer usage of the product.

Figure 5:
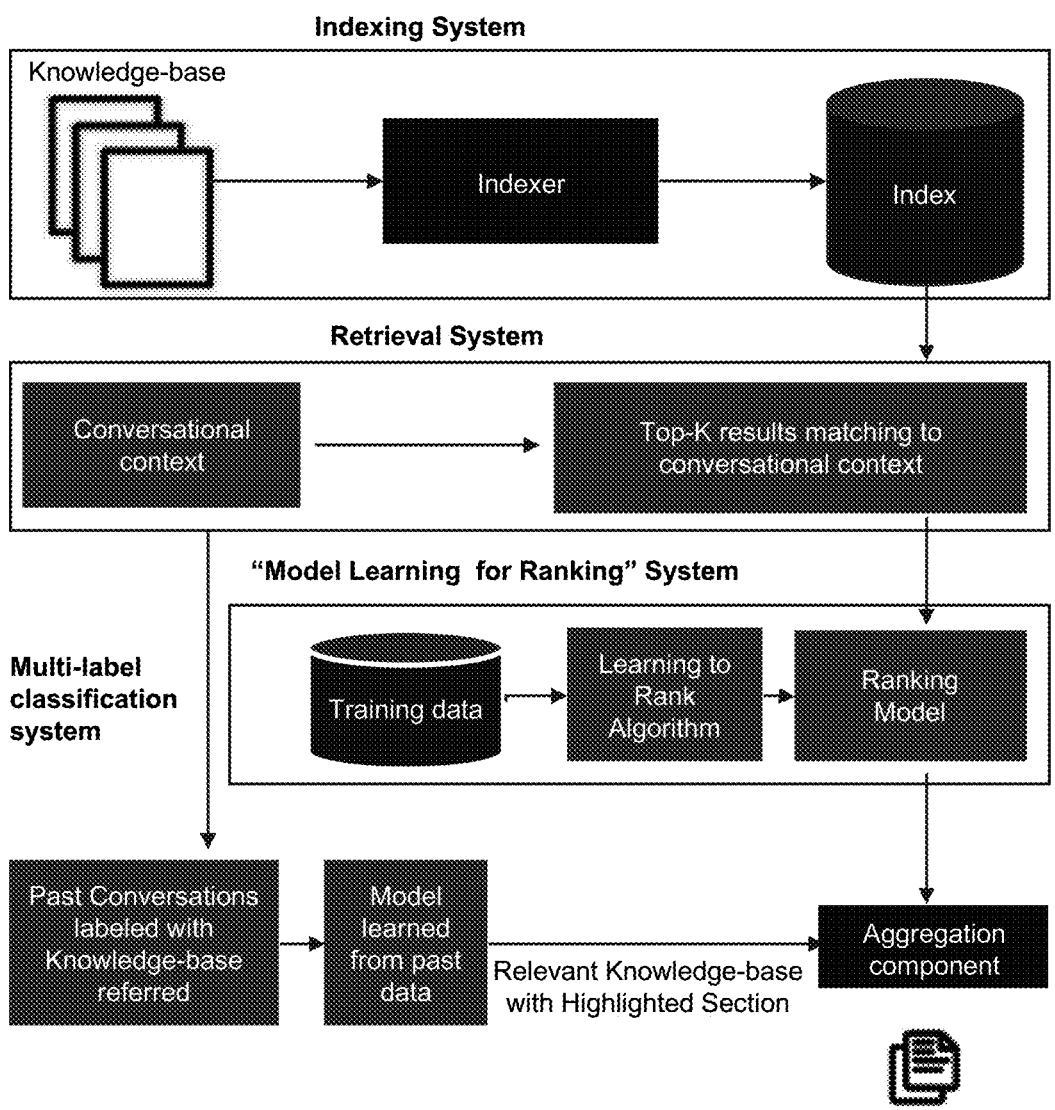
FIG. 5 illustrates a knowledge retrieval AI module that retrieves various documents based on the conversation context.

Referring to FIG. 5, a knowledge retrieval AI module 500 implemented on the CPU 125 performs alone, or in cooperation with the AI subsystem 115, various machine learning techniques to retrieve various documents based on the conversation context. The knowledge retrieval AI module 500 may highlight the portion in the documents relevant for the current conversation.

In this regard, the knowledge retrieval AI module 500 may create an inverted index for all the documents and data within the schema of documents in a database. For example, the knowledge retrieval AI module 500 may utilize Solr technology to automatically parse and infer a schema. The knowledge retrieval AI module 500 may utilize entity extraction (or cataloged entities) to retrieve the top rated documents indexed to a particular entity. Training data may be utilized to calibrate a so-called learning-to-rank algorithm that takes the top K documents identified above and ranks them in the order of relevance to the user's context. In some implementations, the knowledge retrieval AI module 500 may leverage historical data where the experts have recommended the right knowledge-base based on the conversational context.

Figure 6:
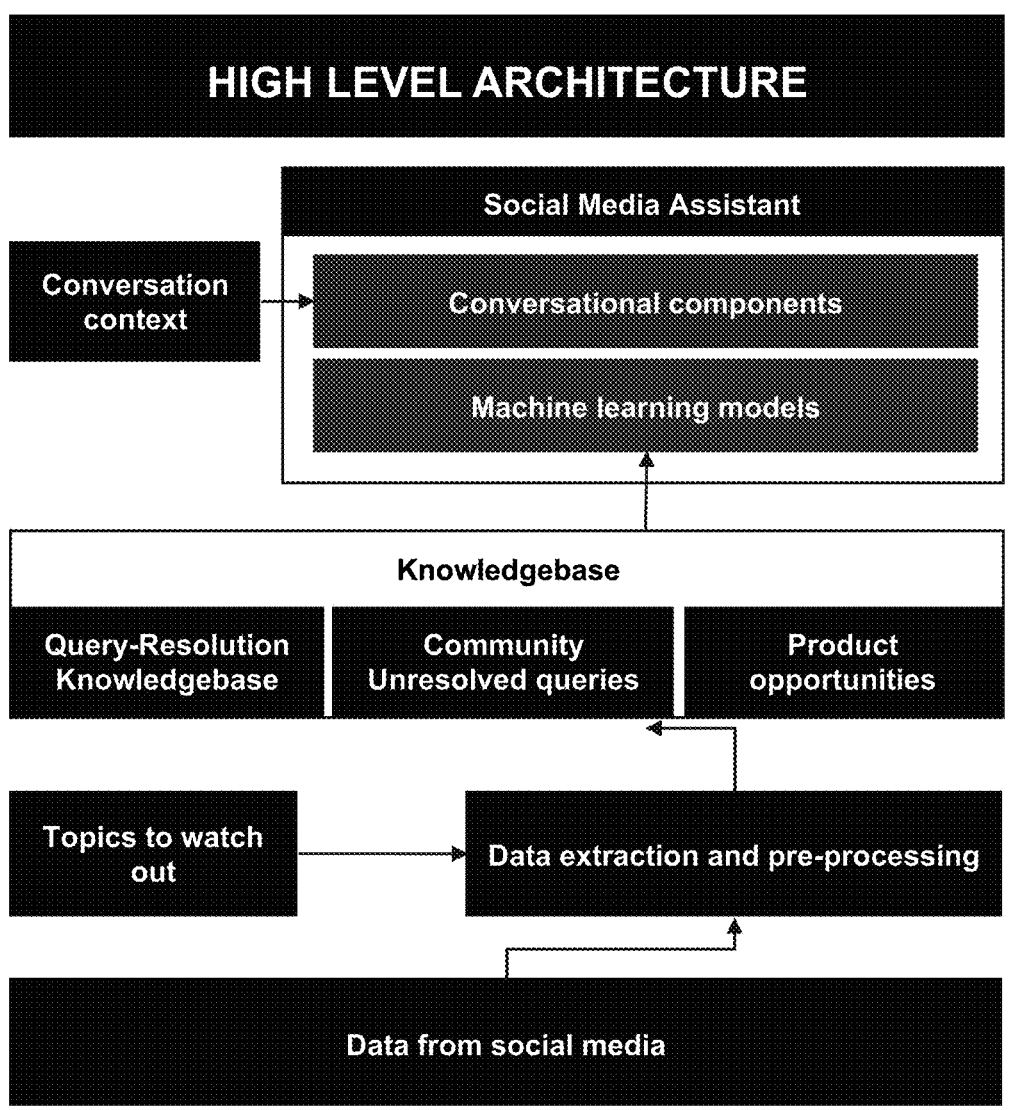
FIG. 6 illustrates a social media assistance AI module that retrieves information from social media data sources and updates a knowledge base of queries and resolutions.

Referring to FIG. 6, a social media assistance AI module 600 implemented on the CPU 125 performs alone or in cooperation with the AI subsystem 115 various machine learning techniques to retrieve information from social media data sources 106 and update a knowledge base of queries and resolutions that may be stored within the call center 102 or elsewhere. The social media assistance AI module 600 may identify new features and product opportunities based on discussions on social media. Such information may be utilized by, for example, a product manager for future product roadmaps.

The social media assistance AI module 600 may identify queries that are unresolved. The unresolved queries may be provided to human experts/agents who may then prepare an appropriate response to the query. The response may be posted back to the social media source on which the query was found by the social media assistance AI module 600.

Figure 7:
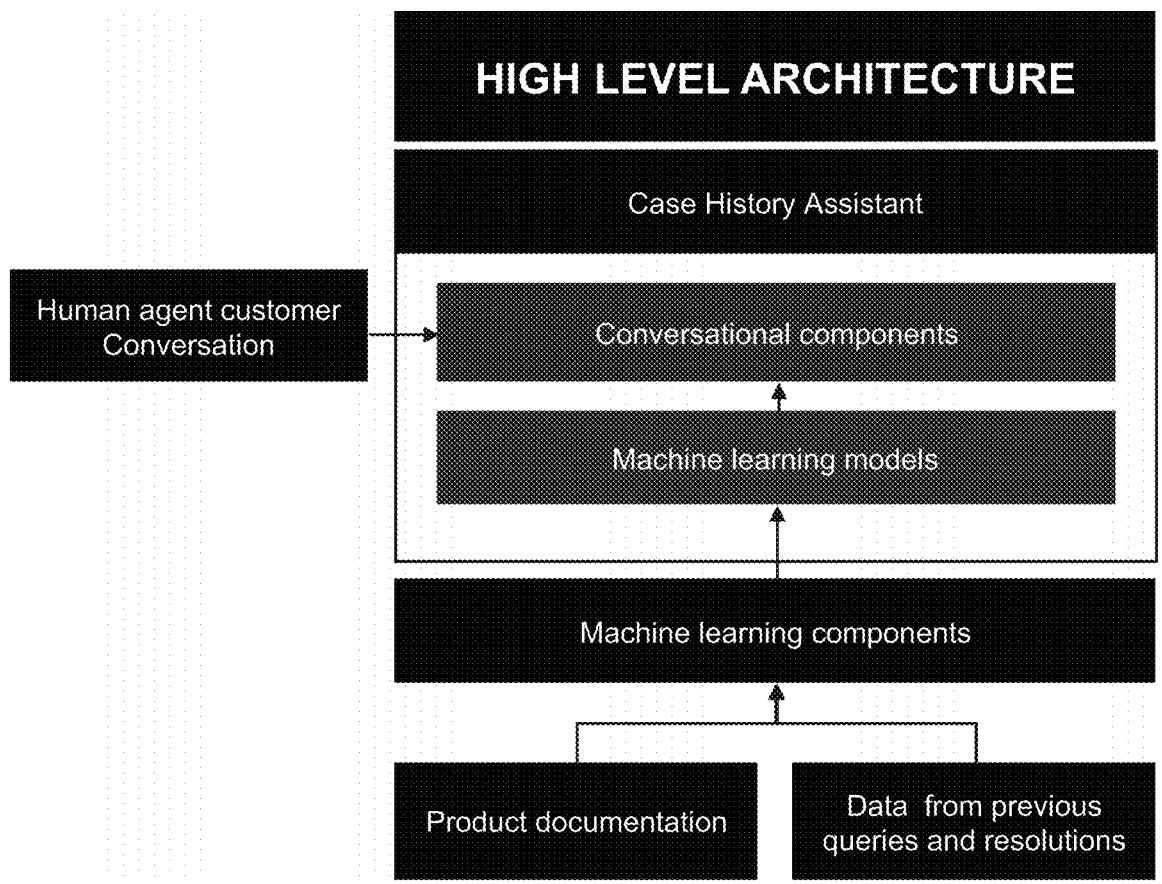
FIG. 7 illustrates a case history assistance AI module that retrieves previous cases/conversations that are similar to a current conversation and ranks the previous cases/conversations according to a similarity score.

Referring to FIG. 7, a case history assistance AI module 700 implemented on the CPU 125 performs alone, or in cooperation with the AI subsystem 115, various machine learning techniques to retrieve previous cases/conversations that are similar to the current conversation and to rank them according to a similarity score. Cases that have a similarity score above a threshold may be identified and communicated to the agent for review.

In this regard, the case history assistance AI module 700 may perform semantical matching of the conversational context with each query and resolution pairs separately. The case history assistance AI module 700 may perform semantic relatedness by computing a context-query relevance score ($cq_i$) and a context-resolution relevance score ($cr_i$). In this regard, prior solutions are stored in the form of query-resolution pairs. A context-query relevance score ($cq_i$) indicates a degree of similarity between the current conversational context and a query associated with a stored case and a context-resolution relevance score ($cr_i$) of the conversation indicates a degree of similarity between the current conversational context and a resolution associated with the stored case. Each score may be determined by using an LDA (latent Dirichlet allocation) methodology.

After computing the scores, query-resolution pairs may be ranked/ordered based on the product of the two relevance scores.

Figure 8:
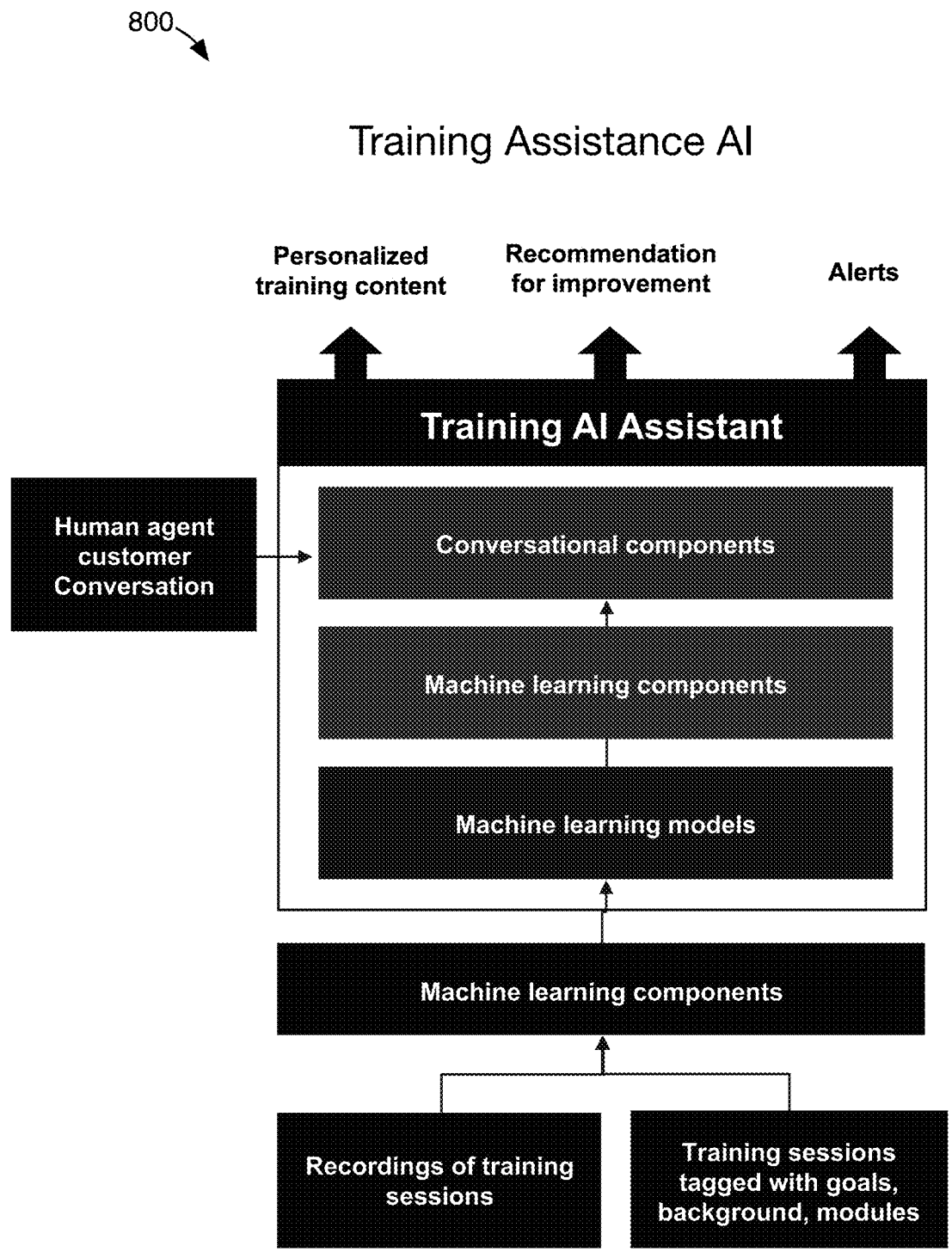
FIG. 8 illustrates a training assistance AI module that identifies ways in which the agent may improve certain aspects of his/her call handling abilities.

Referring to FIG. 8, a training assistance AI module 800 implemented on the CPU 125 performs alone, or in cooperation with the AI subsystem 115, various machine learning techniques to identify ways in which the agent may improve certain aspect of his/her call handling abilities. The training assistance AI module 800 provides personalized training content to the agent to improve the areas where the agent is lacking. The training assistance AI module 800 may adopt a gamification-based model and assign a reward if the agent uses content from the training to improve call handling skills.

In this regard, the training assistance AI module 800 may capture a snapshot of the learner at each point and collaborate with the knowledge retrieval assistant AI module 500 to obtain relevant training material based on a concept being taught. The training assistance AI module 800 may apply word embedding techniques for representing words in a low dimensional vector space. Data for facilitating training may be collected through recordings of experts in providing training to other agents. These recordings may be converted to text and used to train an LSTM of the training assistance AI module 800.

Figure 9:
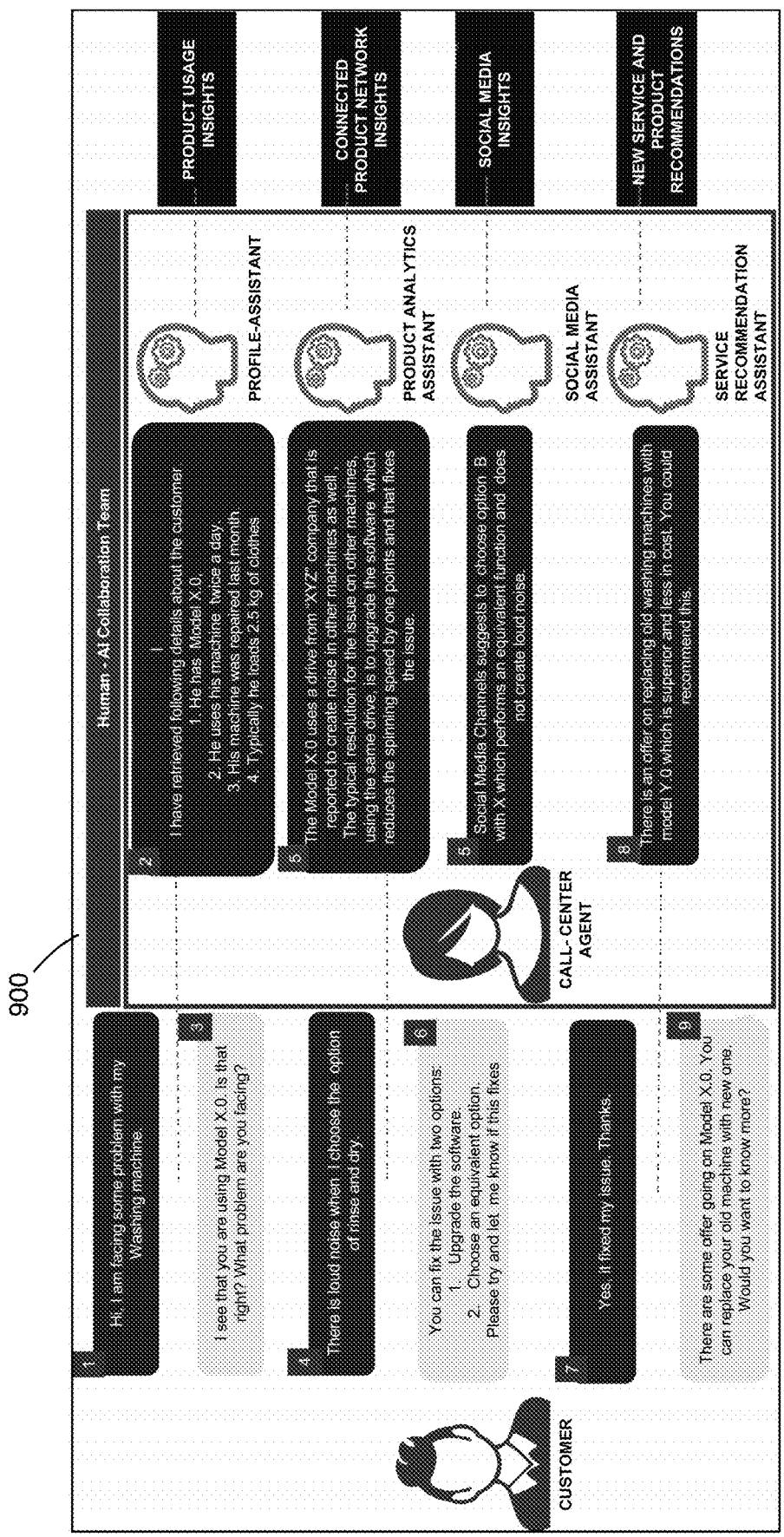
FIG. 9 illustrates an exemplary chat session helper interface 900 that may be generated by the call center.

FIG. 9 illustrates an exemplary chat session helper interface 900 that may be generated by the call center 102 according to the logic of FIG. 2. The chat session helper interface utilizes one or more of the AI assistant modules 225 as an aid to the agent in providing assistance to a customer. The flow of the chat session is illustrated by the numerical values shown in the various dialog boxes of the figure. For example, as indicated in dialog 1, a customer may report a problem with a washing machine. The case history assistance AI module 700 may then determine information related to a washing machine model of the customer and communicate information related to the model to the chat session helper interface 900, as indicated in dialog 2. The agent may respond accordingly, as indicated in dialog 3.

As indicated in dialog 4, the customer may report the type of problem being experienced with the washing machine. The product assistance AI module 400 may determine information related to the problem based on documents associated with the model. The product assistance AI module 400 may further determine information related to a solution to the problem and communicate this information to the chat session helper interface 900, as indicated in dialog 5. The social media assistance AI module 600 may further determine information related to potential solutions to the problem based on information from social media sources and may communicate this information to the chat session helper interface 900, as indicated in dialog 6. The agent may respond accordingly, as indicated in dialog 7.

As indicated in dialog 8, the customer may report that the solution provided by the agent solved the problem. The knowledge retrieval assistance AI module 500 may determine additional information related to the context of the conversation and may provide the information to chat session helper interface 900, as indicated in dialog 9. The agent may respond accordingly, as indicated in dialog 10.

Figure 10:
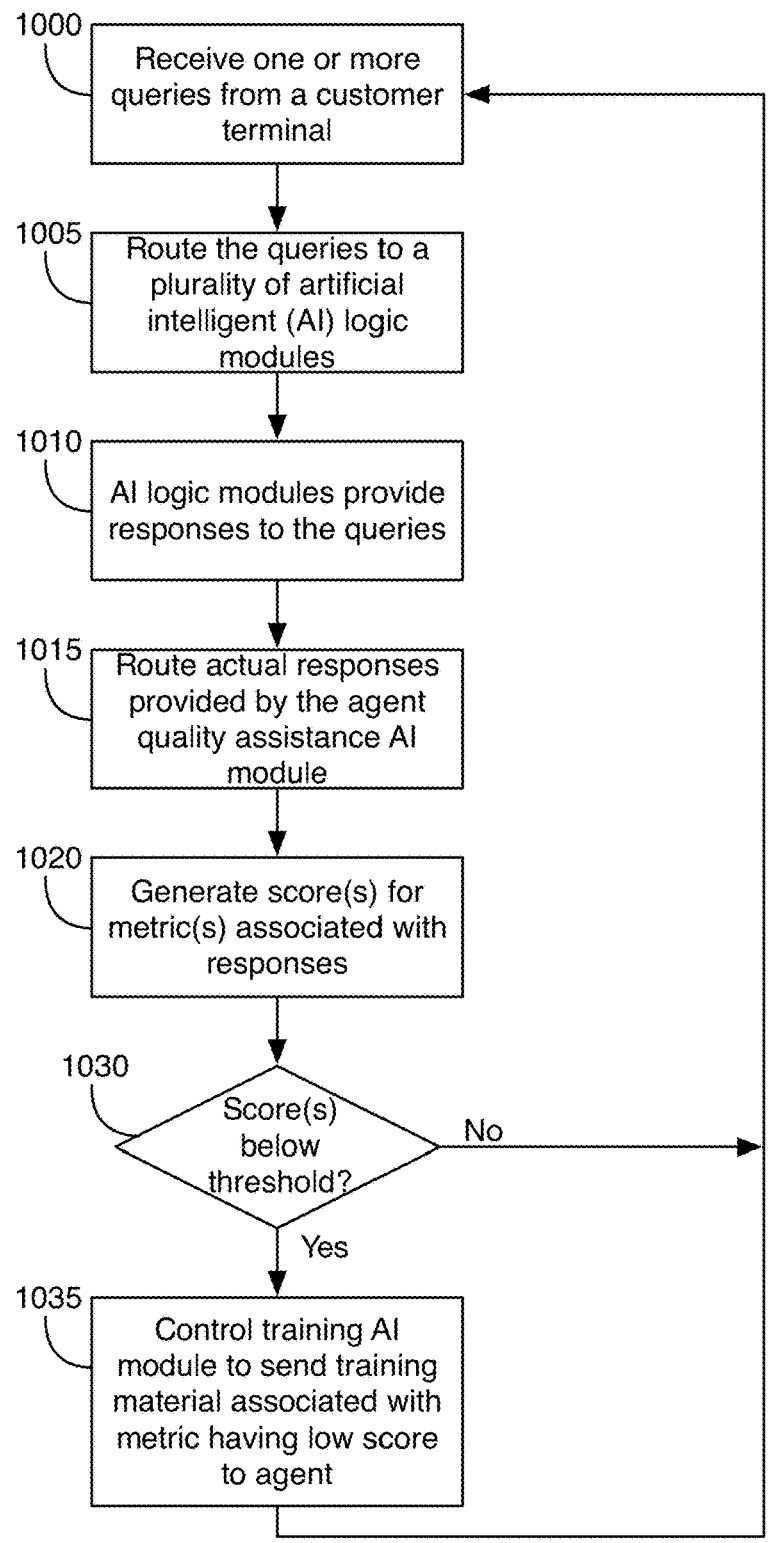
FIG. 10 illustrates operations performed by the call center in assessing a quality of a conversation between an agent and a customer.

FIG. 10 illustrates additional operations performed by the call center in assessing quality of a conversation between and agent and a customer. At operation 1000, the input/output (I/O) subsystem 110 of the call center 102 may receive one or more queries from a customer terminal 105. For example, a query such as the query in dialog 1 of FIG. 9 may be received.

At operation 1005, router logic 215 implemented by the processor 125 and/or the AI subsystem 115 of the call center 102 may route the queries to a plurality of artificial intelligent (AI) logic modules 225. For example, as indicated above, the queries may be routed to the quality assistance AI module 300, the product assistance AI module 400, the knowledge retrieval AI module 500, the social media assistance AI module 600, the case history assistance AI module 700, the training assistance AI module 800, and/or a different AI logic module.

At operation 1010, one or more of the AI logic modules 225 may provide a response to the queries. For example, responses such as those indicated in dialogs 2, 5, 6, and 9 (FIG. 9) may be provided by one or more of the AI modules described above.

At operation 1015, actual responses provided by the agent may be routed to one or more of the AI logic modules 225. For example, the responses indicated in dialogs 3, 7, and 10 (FIG. 9) may be routed to, for example, the quality assistance AI module 300.

At operation 1020, an AI module, such as the quality assistance AI module 300, may generate one or more scores associated with one or more metrics that rate various aspects of responses made by the agent to the customer.

If at operation 1030, the score(s) is/are below a threshold, then at operation 1035, the quality assistance AI module 300 may communicate to the training assistance AI module 800 instructions to cause training information related to metrics having scores below a given threshold to be communicated to the call center agent.

These operations reduce the amount of time needed for an agent to provide an appropriate response to the customer. This in turn, reduces network bandwidth needed by the call center 102 in processing conversations between customers and agents.

Figure 11:
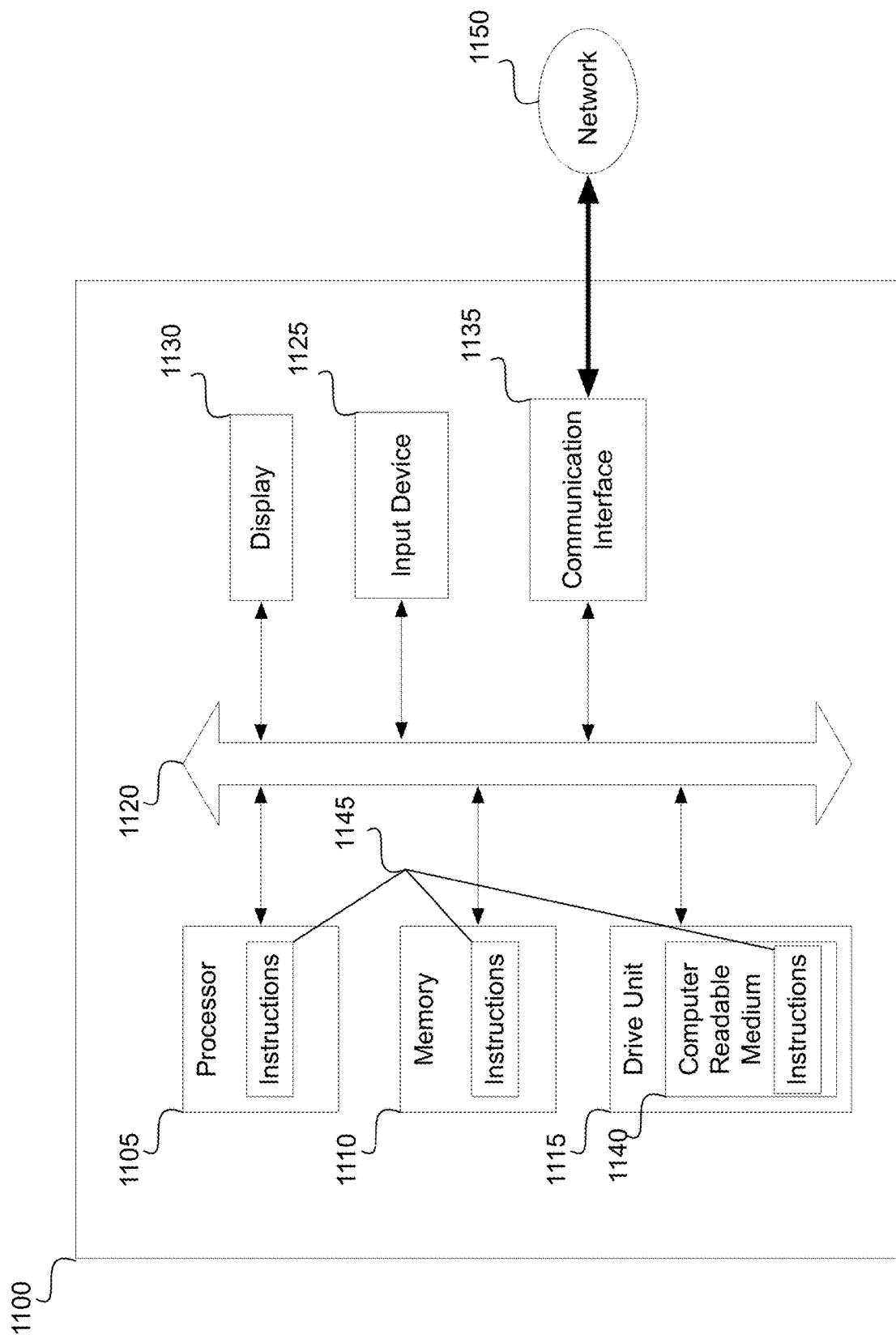
FIG. 11 illustrates an exemplary computer system that may form part of or implement the systems described in the figures or in the following paragraphs.

FIG. 11 illustrates a computer system 1100 that may form part of or implement the systems, environments, devices, etc., described above. The computer system 1100 may include a set of instructions 1145 that the processor 1105 may execute to cause the computer system 1100 to perform any of the operations described above. The computer system 1100 may operate as a stand-alone device or may be connected, e.g., using a network, to other computer systems or peripheral devices.

In a networked deployment, the computer system 1100 may operate in the capacity of a server or as a client computer in a server-client network environment, or as a peer computer system in a peer-to-peer (or distributed) environment. The computer system 1100 may also be implemented as or incorporated into various devices, such as a personal computer or a mobile device, capable of executing instructions 1145 (sequential or otherwise) causing a device to perform one or more actions. Further, each of the systems described may include a collection of subsystems that individually or jointly execute a set, or multiple sets, of instructions to perform one or more computer operations.

The computer system 1100 may include one or more memory devices 1110 communicatively coupled to a bus 1120 for communicating information. In addition, code operable to cause the computer system to perform operations described above may be stored in the memory 1110. The memory 1110 may be a random-access memory, read-only memory, programmable memory, hard disk drive or any other type of memory or storage device.

The computer system 1100 may include a display 1130, such as a liquid crystal display (LCD), a cathode ray tube (CRT), or any other display suitable for conveying information. The display 1130 may act as an interface for the user to see processing results produced by processor 1105.

Additionally, the computer system 1100 may include an input device 1125, such as a keyboard or mouse or touchscreen, configured to allow a user to interact with components of system 1100.

The computer system 1100 may also include a disk or optical drive unit 1115. The drive unit 1115 may include a computer-readable medium 1140 in which the instructions 1145 may be stored. The instructions 1145 may reside completely, or at least partially, within the memory 1110 and/or within the processor 1105 during execution by the computer system 1100. The memory 1110 and the processor 1105 also may include computer-readable media as discussed above.

The computer system 1100 may include a communication interface 1135 to support communications via a network 1150. The network 1150 may include wired networks, wireless networks, or combinations thereof. The communication interface 1135 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

We claim:

1. A call center system for reducing communication latency, the system comprising:
   an input/output (I/O) interface for receiving one or more queries from a customer terminal;
   a processor in communication with the I/O interface; and
   non-transitory computer readable media in communication with the processor that stores instruction code, which when executed by the processor, causes the processor to:
   route the one or more queries to a plurality of artificial intelligent (AI) logic modules;
   receive, from one or more of the AI logic modules, information that facilitates providing, by a call center agent, responses to the one or more queries;
   route actual responses to the one or more queries made by the call center agent to the AI logic modules;
   receive from at least one AI logic module one or more scores associated with one or more metrics that rate different aspects of the actual responses; and
   when at least one of the one or more scores received from the at least one AI logic module is below a threshold, communicate training information to the call center agent, the training information being directed to a subject area associated with the score being below the threshold,
   wherein the at least one AI logic module utilizes a long-short term memory (LSTM) that is trained with conversational data between customer agents and customers that was previously evaluated and ranked by an expert; and
   wherein communication of the information that facilitates providing, by the call center agent, responses to the one or more queries reduces a latency between receipt of the one or more queries and communication of correct responses to the one or more queries.

2. The system according to claim 1, wherein the at least one AI logic module corresponds to a quality assistant AI module that implements machine learning techniques to arrive at the one or more scores associated with the one or more metrics.

3. The system according to claim 2, wherein one or more of the AI logic modules include a training assistant AI module that implements machine learning techniques to identify training information related to the subject area associated with the score being below the threshold.

4. The system according to claim 1, wherein the AI logic modules include:
   a product assistance retrieval AI module that implements machine learning techniques to identify product documentation associated with products that are in turn associated with the one or more queries;
   a case history AI module that implements machine learning techniques to identify potential responses to the one or more queries based on previous sessions between call center agents and customers; and
   a social media assistance AI module that implements machine learning techniques to extract comments on social media sources related to the one or more queries.

5. The system according to claim 1, wherein the instruction code causes the processor to generate an interface accessible to the agent that is updated in real-time with the information that facilitates providing responses to the one or more queries.

6. The system according to claim 1, wherein the social media assistance AI module is configured to forward unresolved queries to an expert and post responses from the expert back to the social media source on which the unresolved queries are found.

7. A method on a call center system for reducing communication latency, the system comprising:
   receiving one or more queries from a customer terminal;
   routing the one or more queries to a plurality of artificial intelligent (AI) logic modules;
   receiving, from one or more of the AI logic modules, information that facilitates providing, by a call center agent, responses to the one or more queries;
   routing actual responses to the one or more queries made by the call center agent to the AI logic modules;
   receiving from at least one AI logic module one or more scores associated with one or more metrics that rate different aspects of the actual responses; and
   when at least one of the one or more scores received from the at least one AI logic module is below a threshold, communicating training information to the call center agent, the training information being directed to a subject area associated with the score being below the threshold,
   wherein the at least one AI logic module utilizes a long-short term memory (LSTM) that is trained with conversational data between customer agents and customer that was previously evaluated and ranked by an expert; and
   wherein communication of the information that facilitates providing, by the call center agent, responses to the one or more queries agent reduces a latency between receipt of the one or more queries and communication of correct responses to the one or more queries.

8. The method according to claim 7, wherein the at least one AI logic module corresponds to a quality assistant AI module that implements machine learning techniques to arrive at the one or more scores associated with the one or more metrics.

9. The method according to claim 8, wherein one or more of the AI logic modules include a training assistant AI module that implements machine learning techniques to identify training information related to the subject area associated with the score being below the threshold.

10. The method according to claim 7, wherein the AI logic modules include:
    a product assistance retrieval AI module that implements machine learning techniques to identify product documentation associated with products that are in turn associated with the one or more queries;
    a case history AI module that implements machine learning techniques to identify potential responses to the one or more queries based on previous sessions between call center agents and customers; and
    a social media assistance AI module that implements machine learning techniques to extract comments on social media sources related to the one or more queries.

11. The method according to claim 7, further comprising generating an interface accessible to the agent that is updated in real-time with the information that facilitates providing responses to the one or more queries.

12. The method according to claim 10, wherein the social media assistance AI module is configured to forward unresolved queries to an expert and post responses from the expert back to the social media source on which the unresolved queries are found.

13. A non-transitory computer readable media that stores instruction code for reducing communication latency in a call center system, the instruction code being executable by a machine for causing the machine to:
    receive one or more queries from a customer terminal;
    route the one or more queries to a plurality of artificial intelligent (AI) logic modules;
    receive, from one or more of the AI logic modules, information that facilitates providing, by a call center agent, responses to the one or more queries;
    route actual responses to the one or more queries made by the call center agent and to the AI logic modules;
    receive from at least one AI logic module one or more scores associated with one or more metrics that rate different aspects of the actual responses; and
    when at least one of the one or more scores received from the at least one AI logic module is below a threshold, communicate training information to the call center agent, the training information being directed to a subject area associated with the score being below the threshold,
    wherein the at least one AI logic module utilizes a long-short term memory (LSTM) that is trained with conversational data between customer agents and customer that was previously evaluated and ranked by an expert; and
    wherein communication of the information that facilitates providing, by the call center agent, responses to the one or more queries reduces a latency between receipt of the one or more queries and communication of correct responses to the one or more queries.

14. The non-transitory computer readable media according to claim 13, wherein the at least one AI logic module corresponds to a quality assistant AI module that implements machine learning techniques to arrive at the one or more scores associated with the one or more metrics.

15. The non-transitory computer readable media according to claim 14, wherein one or more of the AI logic modules include a training assistant AI module that implements machine learning techniques to identify training information related to the subject area associated with the score being below the threshold.

16. The non-transitory computer readable media according to claim 13, wherein the AI logic modules include:
- a product assistance retrieval AI module that implements machine learning techniques to identify product documentation associated with products that are in turn associated with the one or more queries;
- a case history AI module that implements machine learning techniques to identify potential responses to the one or more queries based on previous sessions between call center agents and customers; and
- a social media assistance AI module that implements machine learning techniques to extract comments on social media sources related to the one or more queries.

17. The non-transitory computer readable media according to claim 13, wherein the instruction code causes the processor to generate an interface accessible to the agent that is updated in real-time with the information that facilitates providing responses to the one or more queries.

\* \* \* \* \*